United States Patent
Harms et al.

Patent Number: 5,942,693
Date of Patent: Aug. 24, 1999

[54] SENSOR FOR MEASURING SURFACE EXPANSION OF A HOLLOW BODY WITH FILM PROTECTING AGAINST DIRT AND BURRS

[75] Inventors: Klaus-Christoph Harms, Graz; Paul Kirschbaum, Seiersberg; Josef Glaser, Graz, all of Austria

[73] Assignee: AVL List GmbH, Graz, Austria

[21] Appl. No.: 09/033,602

[22] Filed: Mar. 3, 1998

[30] Foreign Application Priority Data

Mar. 7, 1997 [AT] Austria ................................. 146/97 U

[51] Int. Cl.⁶ .............................. G01L 7/04; G01L 9/08; G01M 15/00
[52] U.S. Cl. ........................... 73/730; 73/119 A; 33/555.4
[58] Field of Search .................... 73/730, 119 A; 33/607, 555.4; 310/338

[56] References Cited

U.S. PATENT DOCUMENTS 5,401,139 3/1995 Nabity et al. ......................... 73/730 X Primary Examiner—Joseph Felber
Attorney, Agent, or Firm—Hill & Simpson

[57] ABSTRACT

A sensor is provided that can be used for measuring the internal pressure of injection lines of diesel engines includes two housing parts that are connected via a joint and can be clamped to the injection line using a clamping device. At least one electrical measuring element is pressed, in essentially uniform elastic fashion, onto the surface of the hollow body to be measured. The sensor also includes a support element that operates essentially in radial fashion. A protective film is arranged between the surface and the measuring element. The protective film has a thickness greater than or equal to the radial dimension of foreign bodies or the like that are to be expected on the surface of the hollow body to be measured. The protective film consists of plastic with a low modulus of elasticity. In this way, impurities, burrs and the like on the tube can easily be "embedded" in the protective film, which, as a result of the low elasticity modulus, nonetheless still ensures a sufficiently good transmission to the measuring element of the surface expansions actually to be measured.

20 Claims, 3 Drawing Sheets

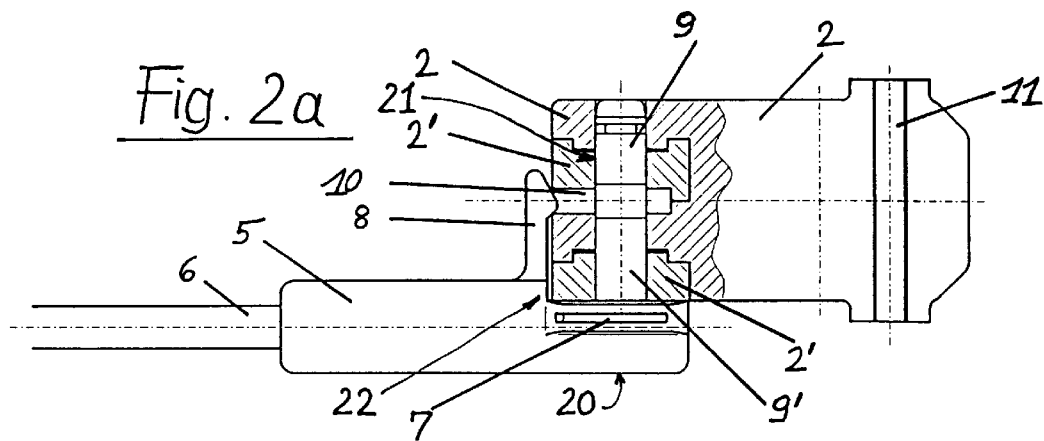
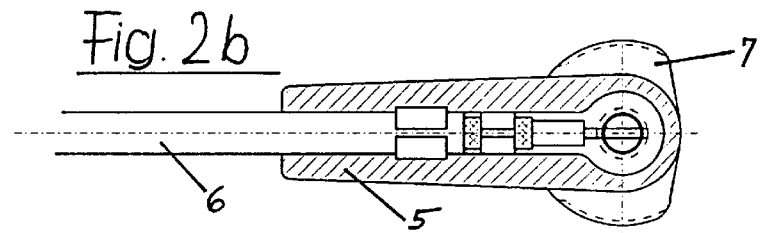
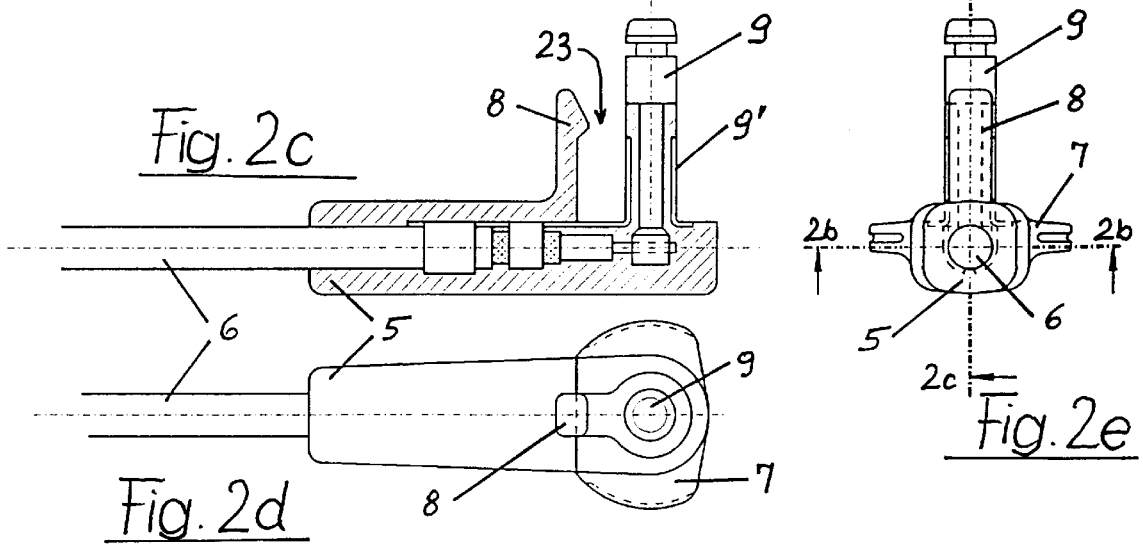

SENSOR FOR MEASURING SURFACE EXPANSION OF A HOLLOW BODY WITH FILM PROTECTING AGAINST DIRT AND BURRS

FIELD OF THE INVENTION:

The present invention relates generally to a sensor for detecting the expansion of the outer surface of a hollow body. More specifically, the present invention relates to sensors for measuring the interior pressure of injection lines of diesel internal combustion engines having at least one electrical measuring element that can be pressed, in essentially uniform elastic fashion, onto the surface of the hollow body to be measured.

BACKGROUND OF THE INVENTION

Sensors are used for the testing and diagnosis of diesel engines equipped with conventional injection systems. These internal combustion engines often have no electrical means that would enable a simple and rapid determination of, for example, the RPM, the beginning of fuel conveyance and the injection pressure curve, which are all important for the recognition of errors in the injection system that often result in impermissibly poor exhaust values. Thus, there is a need for economical, rugged and sufficiently precise sensors that can be attached to the internal combustion engine easily and rapidly and that permit such measurements.

Sensors whose designs are somewhat suited for these purposes, having various features, are known for example from the following letters patents: AT-PS 375.466, AT-PS 353.507, AT-PS 373.393, AT-PS 373.394, AT-PS 374.007, AT-PS 374.280. In addition, for example DE 40 02 790 C2 is also known, which also refers to some of the documents named above.

However, all known sensors of this type are relatively expensive, due to their construction and the parts used. In addition, the thin metallic protective film used for the frictionally engaged connection between the injection line tube and the measuring element is extremely fragile. Therefore, an injection line must be polished before the sensor is clamped in place. Burrs and dirt must be removed, and further, any protective layer or coat of lacquer that may be present must also be removed because this layer not only causes an enlargement of the tube diameter that is impermissible for the use of the known sensors, but also prevents the required electrical contact of the sensor to the engine frame.

The object of the invention is to avoid the mentioned disadvantages of the known sensors, and to indicate a sensor of the type named above that is simple and durable, that can be used even on painted lines, and that above all is also economical due to its manner of construction, while nonetheless maintaining good measurement characteristics.

SUMMARY OF THE INVENTION

This object is solved according to the present invention in that the protective film has a thickness greater than or equal to the radial dimension of foreign bodies, impurities or the like that are to be expected on the surface of the hollow body to be measured. Further, the protective film is made from plastic with a low modulus of elasticity.

It has been determined that the measurement quality and the ruggedness of the sensor depend quite essentially on the protective film. This protective film must on the one hand produce, by frictional engagement, the connection of the tube to the measuring element, so that the tube deformation can be acquired by the measuring element. On the other hand, the protective film must protect the measuring element from damage that can occur due to burrs of the steel tube or due to dirt and particles on the tube surface. In known sensors, very thin metallic films are used for this purpose, which, in the standard monopole constructions, also produce the electrical contact to the ground potential, e.g. of the engine. These sensors have been based on the fact that these films, which comprise a relatively hard surface having an elasticity modulus of e.g. 135,000 N/mm$^2$, represent a good compromise between hardness and frictional engagement on the one hand and thickness on the other hand, putting up with the fact that these protective films are not infrequently pierced by sharp foreign bodies, which thus destroy the sensor.

The present invention essentially stems from the fact that relatively soft protective films with a greater thickness, which may enable a risk-free depositing or, respectively, embedding of foreign bodies, impurities or the like, can preferably be used with sensors of this type in cases in which, by means of a relatively low elasticity modulus, it nonetheless remains ensured that the surface expansions of the hollow body can be transmitted to the actual measuring element to a degree that is still sufficient for obtaining a measuring signal. Surprisingly, it has thereby turned out that protective films made of plastic that is in principle significantly more fragile, but which can however be e.g. 20 times as thick as a metal film due to the lower elasticity modulus of e.g. 4,000 N/mm$^2$, can offer a much better protection, while the measuring quality remains good. Suitable plastics standardly have an elasticity modulus in the range of about 1000–8000 N/mm$^2$.

In a preferred embodiment of the invention, the protective film has a thickness of up to 10% of the hollow body diameter. This surprisingly high value offers solid protection against damage to the measuring element, and still offers a good measuring quality.

For measurement on injection lines with outer diameters in the range of 4 to 6 mm, a further embodiment of the invention has proven excellent, according to which the protective film is made of polyamide, with a film thickness in the range of about 0.2 to 0.3 mm, and an elasticity modulus in the range of about 4000 N/mm$^2$. Films of this type are simple and economical to procure, and, in normal operation of sensors of this type, ensure excellent measurement results, with a simultaneously greatly reduced sensitivity to foreign bodies and the like on the hollow body to be measured.

According to a further preferred embodiment of the invention, the protective film can tightly surround the measuring element on all sides—except for its electrical contactings that lead away—in the form of a sealed capsule. This embodiment enables the construction of a robust sensor and, for example, also enables the simple exchange of a damaged measuring element. The electrical contactings can thereby be arranged on flexible print films or the like, which can preferably also for example be fashioned for the electrical connection of two housing halves that work together in the operation of the sensor, or, respectively, the measuring elements thereof.

For many applications, a further embodiment of the invention has proved advantageous, according to which in addition the support element is also arranged inside the protective film capsule. This measure also makes the sensor more robust or rugged and less susceptible to damages in operation—the exchange of, e.g., a broken measuring element, together with its support element, moreover ensures the maintenance of pressure ratios for the measuring element relative to the hollow body to be measured.

An advantageous construction of the invention provides that the two housing parts, preferably injection-molded from electrically insulating plastic, are constructed essentially symmetrical to one another, and comprise recesses for positive acceptance of the support element, the measuring element, and the protective film. Accordingly, cost savings result in the injection-molding equipment, and above all a disturbing signal compensation that is advantageous for the measuring and is based on the measurement signal acquisition, which acquisition ensues largely in radially symmetrical fashion. Moreover, the assembly is essentially simplified in that the parts do not have to be positioned with difficulty, but rather are guided by the elements of the housing parts provided for this purpose, are easily brought into the correct position and can be held there.

In an embodiment, the support element and the measuring element are only laid into the housing part and clamped, but are not glued or welded, additional advantages result in the manufacturing costs.

In an embodiment, the protective film of each measuring element is made of plastic, is tightly connected to the housing, and thus forms, with the housing, a tight capsule for the measuring element.

The measuring element is thus no longer exposed to the influences of dangerous gases and liquids that can have a destructive effect on the sensitive zones, the charge runoff, and in particular also the electrical insulation.

In an embodiment, the protective film is connected with the housing by means of a positively locking groove-spring connection. By this means, a simple laying in and/or press-fit is enabled, which can ensure a relatively high tightness and solidity even without more extensive connection technology.

The gluing of the protective film with the housing part represents an inventive improvement, whereby it must be taken into account that not all material combinations are equally well gluable. In the known sensors, the metallic protective film must be glued to the support element made of rubber, and this element must be glued to the plastic part. The fact that such expensive and difficult glued connections can in the present case be replaced by for example a gluing of plastic with plastic represents a significant improvement and reduction in cost.

In an embodiment, the present invention provides a sensor for measuring an expansion of an outer surface of a hollow body having a diameter. The sensor comprises at least one protective film engaging at least part of the outer surface of the hollow body. The protective film is disposed between the hollow body and at least one electrical measuring element. The electrical measuring element is disposed between the protective film and at least one elastic support element. The protective film has a thickness ranging from greater than 3% of the diameter of the hollow body to about 10% of the diameter of the hollow body.

In an embodiment, if the hollow body has a diameter ranging from about 4 mm to about 6 mm, the protective film can have a thickness ranging from about 0.2 mm to about 0.3 mm.

In an embodiment, the protective film has an elasticity modulus of about 4000 $N/mm^2$.

In an embodiment, the protective film, measuring element and elastic support are attached to a housing.

In an embodiment, the protective film covers and encapsulates the housing, measuring element and elastic support.

In an embodiment, the housing comprises first and second pivotally connected housing parts. The first and second housing parts are clamped around the hollow body. Each housing part accommodates an elastic support, electrical measuring element and protective film.

In an embodiment, the housing parts include recesses for accommodating the elastic support, measuring element and protective film in a press-fit attachment.

In an embodiment, the protective film is glued to the housing.

In an embodiment, the protective film is attached to the housing by way of ultrasonic welding.

In an embodiment, the elastic support and measuring element are press fit onto their respective housing parts without gluing or welding.

Other objects and advantages of the present invention will become apparent from reading the following detailed description and appended claims, and upon reference to the accompanying drawings.

BRIEF DESCRIPTION OF THE DRAWING

A preferred embodiment of the invention will now be specified on the basis of the figures.

FIG. 2*a* illustrates a partial top sectional view of the plug connection and clamp of the sensor shown in FIGS. 1*a* and 1*b*.

FIG. 2*b* is a sectional view taken substantially along line A–B of FIG. 2*e*.

FIG. 2*c* is a sectional view taken substantially along line C–D of FIG. 2*e*.

FIG. 2*d* is a top plan view of the plug connection of the sensor shown in FIG. 1.

FIG. 2*e* is an end view of the plug connection of the sensor shown in FIG. 1.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1A:
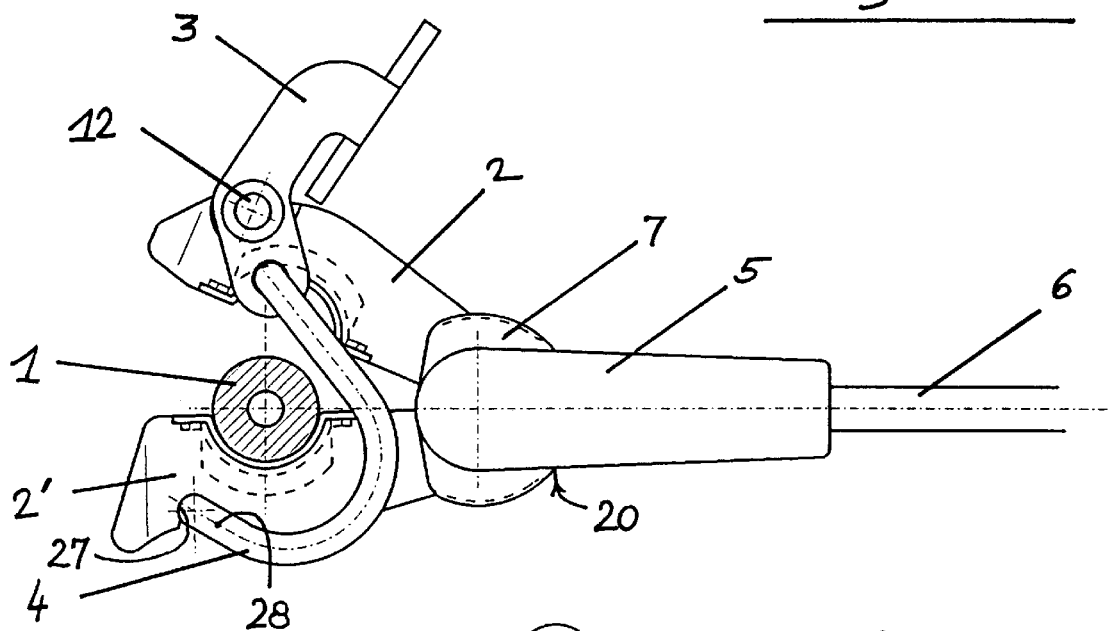
FIG. 1*a* illustrates a side view of an exemplary embodiment of a sensor made in accordance with the present invention with a plug and cable terminal, in the open position.
Figure 1B:
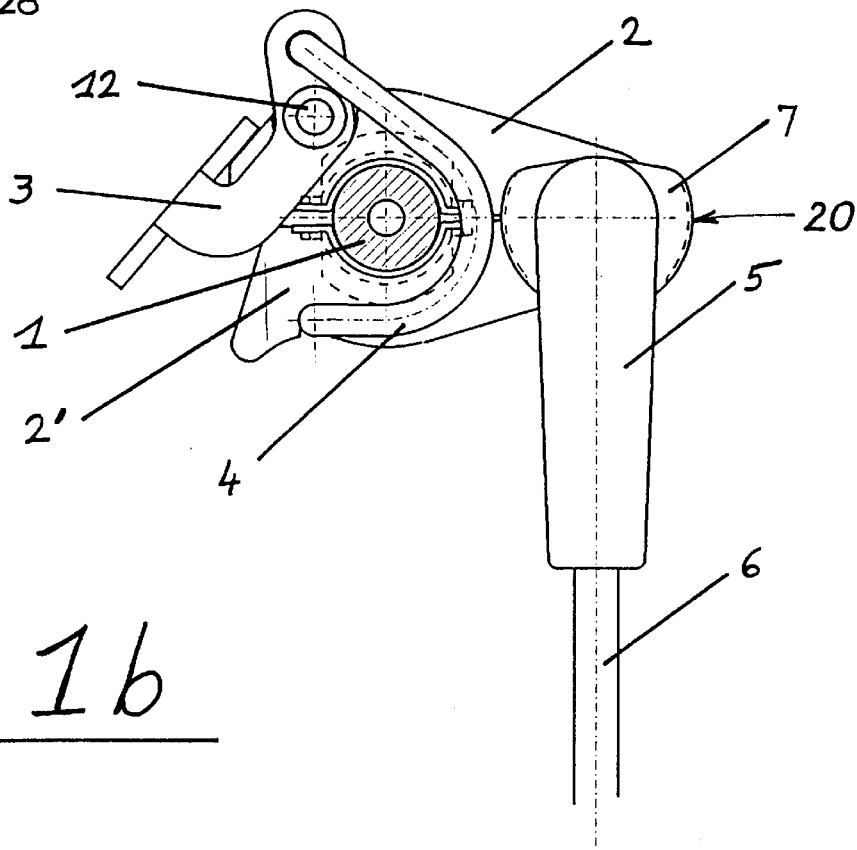
FIG. 1*b* illustrates a side view of the sensor shown in FIG. 1*a*, in the closed position.

FIGS. 1*a* and 1*b* clearly shows the injection line 1, a clamping lever 3 attached in articulated fashion to a first housing part 2 and a tension spring 4 attached in an articulated fashion to a second housing part 2', whereby a clamping assembly 3, 4 is located, in both the open and closed positions as shown in FIG. 1a and FIG. 1b respectively. The clamping assembly, consisting of a lever 3 and a tension spring 4, is essentially disposed on the same side of the tube 1, and connects the two housing parts 2, 2' in an articulated fashion. A plug 20, constructed as a right angle plug 20, with a cable terminal 5 for a cable 6 and with a stop plate 7, is plugged into the joint, which simultaneously functions as a socket.

It can be seen that in the open position (FIG. 1a) the plug 20 with the stop plate 7 would be blocked by the tension spring 4 if the plug were rotated into the position shown in FIG. 1b. In the closed position (FIG. 1b), the plug 20 is held primarily by means of the clamping forces exerted on it.

FIG. 2a shows the plug with a snap stop 8 that snaps into an air gap 10, and shows a jack plug pin 21, with the two contact zones 9 and 9' insulated from one another, that serves as an axle for the two housing parts 2, 2' inserted in the joint 22. In addition, the plug 20 is separated from the housing parts 2, 2' by the air gap 10. Cylindrical projections 9, 9', 8 and the recess 23 shown in between the plug 20 and housing parts 2, 2' form an auxiliary connection, and a guide edge that can be seen in the center of the air gap 10 on the two housing parts 2, 2' serves for the axial positioning, or, respectively, for the maintenance of the air gap 10. In addition, a groove 11 in the housing part 2 is clearly visible, into which the joint axle 12 (see FIGS. 1a and 1b) of the clamp lever 3 is disposed. Similarly, a corresponding groove 27 is located in the housing part 2', into which the end 28 of the tension spring 4 is snapped so that the end 28 of the spring 4 serves as a joint axle. Also not shown here are the metallic contact surfaces contained in the joint, which serve as a socket for the jack plug 20.

Figure 3A:
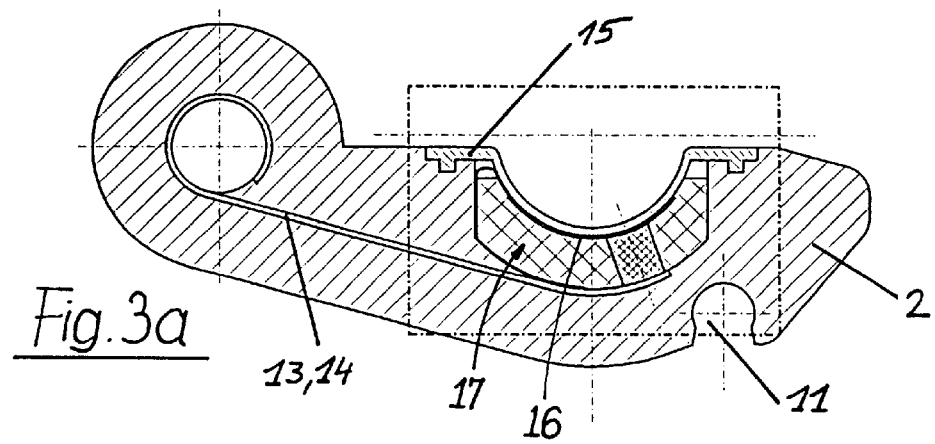
FIG. 3*a* is a sectional view of one housing part of the sensor shown in FIG. 1.
Figure 3B:
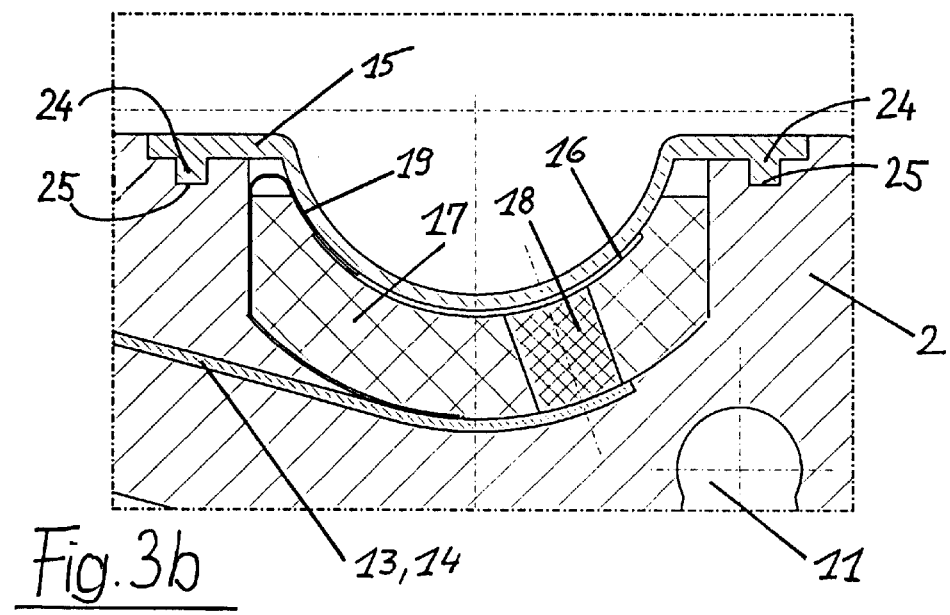
FIG. 3*b* is an expanded view of the housing part shown in FIG. 3*a*.
Figure 3C:
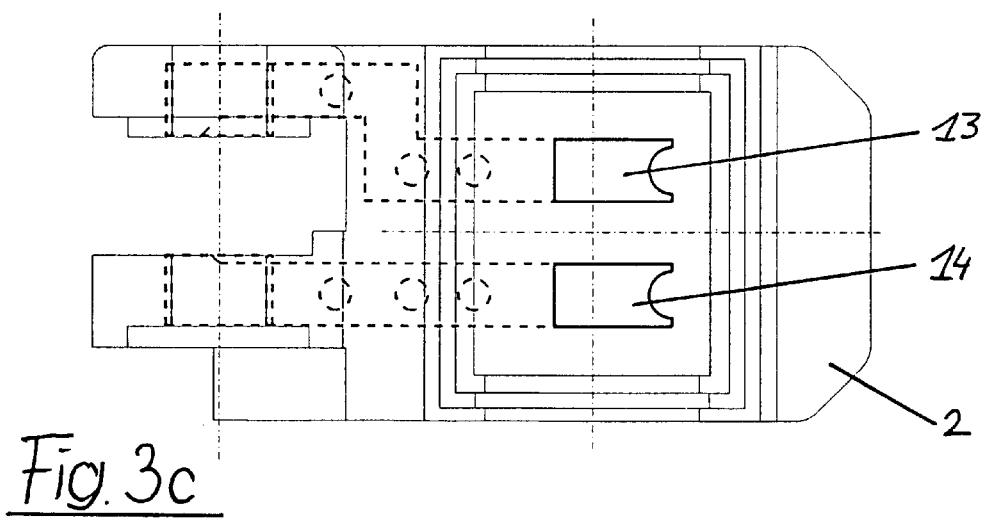
FIG. 3*c* is a plan view of the housing part shown in FIG. 3*a*.

However, in FIGS. 3a–3c metal connecting parts 13 and 14 which are integrated into the housing parts 2, 2' can be seen clearly. Protected by a protective film 15 (constructed here, with surrounding spring elements, as a plastic injection-molded part), a measuring element 16, e.g., apiezaelective element, is in contact with an elastic supporting element 17. An electrically conductive elastomer 18, as well as a thin metal film 19, conduct the electrical signal from the measuring element to the contact zones of the two metal parts 13 and 14, which conduct the signal in correctly poled fashion to the contact surfaces, contained in the subjoints, of the socket for the jack plug 20.

The protective film 15 has a thickness that is greater than or at least equal to the dimension of foreign bodies, impurities, furrows, burrs, or the like that are to be expected on the surface of the hollow body to be measured in the radial direction thereof, so that impurities and the like of this sort can be embedded, as it were, in the protective film made of relatively soft plastic (with a low elasticity modulus), without the danger of damage to the measuring element 16. The protective film 15 may be made of polyamide with a film thickness in the region of about 0.2 to 0.3 mm and an elasticity modulus in the region of about 4000 N/mm$^2$. Such films 15 have proven suitable for standard injection lines of diesel internal combustion engines with outer diameters in the range of 4 to 6 mm. Films of this sort are easy to manufacture or, respectively, to procure, and provide excellent coverage of normal areas of application with respect to their protective effect and sufficient transmission of the surface expansions actually to be measured.

In the embodiment shown and discussed, the two housing parts 2, 2' are constructed essentially symmetrical to one another with respect to the measuring element(s) 16, and comprise recesses for the positive acceptance of the support element 17, the measuring element 16 and the protective film 15. The support element 17 and measuring element 16 are here only laid in and clamped into the respective housing part 2, 2', but are not glued or welded. The protective film 15 of each measuring element is tightly connected with the housing 2, 2' in that it is set into or, respectively, pressed into a positively locking groove-spring connection as shown by the protruding members 24 and complimentary recesses 25, whereby a tight capsule for the measuring element is formed together with the housing. However, apart from this, the protective film 15 could tightly surround the measuring element on all sides in the form of a sealed capsule—except for the electrical contacts thereof that lead away—which capsule could in addition also contain the support element, whereby a robust sensor with easily exchangeable elements is realized.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A sensor for measuring an expansion of an outer surface of a hollow body, the hollow body having a diameter, the sensor comprising:

at least one protective film engaging at least part of the outer surface of the hollow body, the protective film being disposed between the hollow body and at least one electrical measuring element, the electrical measuring element being disposed between the protective film and at least one elastic support, the protective film having a thickness ranging from greater than 3% to about 10% of the diameter of the hollow body.

2. The sensor of claim 1 wherein the hollow body has a diameter ranging from about 4 mm to about 6 mm and the protective film has a thickness ranging from about 0.2 mm to about 0.3 mm.

3. The sensor of claim 1 wherein the protective film has an elasticity modulus of about 4000 N/mm$^2$.

4. The sensor of claim 1 wherein the protective film, measuring element and elastic support are attached to a housing, the protective film covers the housing and seals the measuring element and elastic support between the housing and the protective film.

5. The sensor of claim 1 further comprising a first housing part and a second housing part, the first and second housing parts being pivotally connected and clamped around the hollow body, the at least one electrical measuring element comprises a first measuring element and a second measuring element, the at least one protective film comprises a first protective film and a second protective film, the at least one elastic support comprises a first elastic support and a second elastic support, the first housing part including a recess for accommodating the first elastic support, the first elastic support being disposed between the first measuring element and the first housing part, the first measuring element being disposed between the first protective film and the first elastic support, the first protective film being disposed between at least part of the outer surface of the hollow body and the first measuring element, the second housing part including a recess for accommodating the second elastic support, the second elastic support being disposed between the second measuring element and the second housing part, the second measuring element being disposed between the second protective film and the second elastic support, the second protective film being disposed between at least part of the outer surface of the hollow body and the second measuring element.

6. The sensor of claim 5 wherein the first housing part further comprises at least one recess for accommodating at least part of the first measuring element and at least one recess for accommodating at least part of the first protective film, the second housing part further comprises at least one recess for accommodating at least part of the second measuring element and at least one recess for accommodating at least part of the second protective film.

7. The sensor of claim 5 wherein the first and second housing parts are from injection molded plastic.

8. The sensor of claim 6 wherein the first elastic support and the first measuring element are press fit onto the first housing part without gluing or welding, the second elastic support and the second measuring element are press fit onto the second housing part without gluing or welding.

9. The sensor of claim 5 wherein the first protective film surrounds and encapsulates at least a portion of the first housing part thereby sealing the first measuring element and the first elastic support underneath the first protective film, the second protective film surrounds and encapsulates at least a portion of the second housing part thereby sealing the second measuring element and the second elastic support underneath the second protective film.

10. The sensor of claim 5 wherein the first protective film is glued to the first housing part, the second protective film is glued to the second housing part.

11. The sensor of claim 5 wherein the first protective film is connected to the first housing part with ultrasonic welding, the second protective film is connected to the second housing part with ultrasonic welding.

12. A sensor for measuring an expansion of an outer surface of a hollow body, the hollow body having a diameter ranging from 4 mm to 6 mm, the sensor comprising:

at least one protective film engaging at least part of the outer surface of the hollow body, the protective film being disposed between the hollow body and at least one electrical measuring element, the electrical measuring element being disposed between the protective film and at least one elastic support, the protective film having a thickness ranging from about 0.12 mm to about 0.6 mm.

13. The sensor of claim 12 wherein the protective film has an elasticity modulus of about 4000 N/mm$^2$.

14. The sensor of claim 12 wherein the protective film, measuring element and elastic support are attached to a housing, the protective film covers the housing and seals the measuring element and elastic support between the housing and the protective film.

15. The sensor of claim 12 further comprising a first housing part and a second housing part, the first and second housing parts being pivotally connected and clamped around the hollow body, the at least one electrical measuring element comprises a first measuring element and a second measuring element, the at least one protective film comprises a first protective film and a second protective film, the at least one elastic support comprises a first elastic support and a second elastic support, the first housing part including a recess for accommodating the first elastic support, the first elastic support being disposed between the first measuring element and the first housing part, the first measuring element being disposed between the first protective film and the first elastic support, the first protective film being disposed between at least part of the outer surface of the hollow body and the first measuring element, the second housing part including a recess for accommodating the second elastic support, the second elastic support being disposed between the second measuring element and the second housing part, the second measuring element being disposed between the second protective film and the second elastic support, the second protective film being disposed between at least part of the outer surface of the hollow body and the second measuring element.

16. The sensor of claim 15 wherein the first protective film is glued to the first housing part, the second protective film is glued to the second housing part.

17. The sensor of claim 15 wherein the first protective film is connected to the first housing part with ultrasonic welding, the second protective film is connected to the second housing part with ultrasonic welding.

18. The sensor of claim 15 wherein the first housing part further comprises at least one recess for accommodating at least part of the first measuring element and at least one recess for accommodating at least part of the first protective film, the second housing part further comprises at least one recess for accommodating at least part of the second measuring element and at least one recess for accommodating at least part of the second protective film.

19. The sensor of claim 18 wherein the first elastic support and the first measuring element are press fit onto the first housing part without gluing or welding, the second elastic support and the second measuring element are press fit onto the second housing part without gluing or welding.

20. A sensor for measuring an expansion of an outer surface of a fuel injection line of a diesel engine, the injection line having a first diameter ranging from 4 mm to 6 mm, the injection line being exposed to dirt, grit and foreign bodies having a second diameter, the sensor comprising:

a first housing part and a second housing part, the first and second housing parts being pivotally connected and clamped around the injection line, the first housing part including a recess for accommodating a first elastic support, the first elastic support being disposed between a first measuring element and the first housing part, the first measuring element being disposed between a first protective film and the first elastic support, the first protective film being disposed between at least part of the outer surface of the injection line and the first measuring element, the second housing part including a recess for accommodating a second elastic support, the second elastic support being disposed between a second measuring element and the second housing part, the second measuring element being disposed between a second protective film and the second elastic support, the second protective film being disposed between at least part of the outer surface of the injection line and the second measuring element, the first and second protective films each having a thickness ranging from about 0.2 mm to about 0.3 mm and an elasticity modulus of about 4000 N/mm$^2$, whereby the protective film is thicker than second diameter of the dirt, grit and foreign bodies but has an elasticity modulus sufficiently low enough to transmit the expansion of the injection line to the measuring element.

* * * * *